(12) United States Patent
Tanaka et al.

(10) Patent No.: US 12,510,192 B2
(45) Date of Patent: Dec. 30, 2025

(54) SEAL MEMBER AND PIPE JOINT USING THE SEAL MEMBER

(71) Applicant: KUBOTA CORPORATION, Osaka (JP)

(72) Inventors: Ryunosuke Tanaka, Amagasaki (JP); Keita Oda, Amagasaki (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/988,104

(22) Filed: Dec. 19, 2024

(65) Prior Publication Data
US 2025/0216008 A1 Jul. 3, 2025

(30) Foreign Application Priority Data
Dec. 27, 2023 (JP) .................................. 2023-220688

(51) Int. Cl.
*F16L 21/03* (2006.01)
*F16J 15/02* (2006.01)

(52) U.S. Cl.
CPC ............. *F16L 21/03* (2013.01); *F16J 15/022* (2013.01)

(58) Field of Classification Search
CPC .. F16L 21/00; F16L 21/02; F16L 21/03; F16J 15/022
See application file for complete search history.

(56) References Cited

U.S. PATENT DOCUMENTS

| | | | | |
|---|---|---|---|---|
| 8,573,654 | B2 * | 11/2013 | Kishi | F16L 27/1275 285/110 |
| 9,488,300 | B2 * | 11/2016 | Kishi | F16L 21/03 |
| 9,719,618 | B2 * | 8/2017 | Kishi | F16L 17/032 |
| 10,006,572 | B2 * | 6/2018 | Kishi | F16L 21/04 |
| 10,018,290 | B2 * | 7/2018 | Kishi | F16L 23/032 |
| 10,520,119 | B2 * | 12/2019 | Kishi | F16L 21/08 |
| 10,738,919 | B2 * | 8/2020 | Kishi | F16L 23/024 |
| 2011/0278835 | A1 * | 11/2011 | Kishi | F16L 21/02 285/348 |
| 2014/0035282 | A1 * | 2/2014 | Kishi | F16L 27/1275 285/374 |
| 2014/0203554 | A1 * | 7/2014 | Kishi | F16L 37/088 285/374 |
| 2015/0292656 | A1 * | 10/2015 | Kishi | F16K 3/30 285/356 |

(Continued)

FOREIGN PATENT DOCUMENTS

JP 4836870 B 12/2011

*Primary Examiner* — Nicholas L Foster
(74) *Attorney, Agent, or Firm* — RENNER, OTTO, BOISSELLE & SKLAR, LLP

(57) ABSTRACT

A seal member includes a heel fitted into a setting groove of a socket and a bulb-shaped portion to be compressed between the socket and a spigot. The bulb-shaped portion includes a first and a second projecting portion respectively formed on the outer side and the inner circumferential side thereof. A first radius of a first circle of the first projecting portion is smaller than a second radius of a second circle including a circular arc-shaped outline of the second projecting portion. The center of the first circle is located within the second circle. The distance between the center of the first circle and the center of the second circle in the axial direction of the seal member is smaller than the difference between the second radius and the first radius.

6 Claims, 14 Drawing Sheets

(56) References Cited

U.S. PATENT DOCUMENTS

| | | | | |
|---|---|---|---|---|
| 2016/0102790 A1* | 4/2016 | Kishi | ..................... | F16L 21/04 |
| | | | | 285/374 |
| 2016/0102792 A1* | 4/2016 | Kishi | ................ | F16L 27/12751 |
| | | | | 285/399 |
| 2016/0290540 A1* | 10/2016 | Kishi | ........................ | F16L 1/09 |
| 2018/0292033 A1* | 10/2018 | Kishi | .................... | F16L 23/024 |
| 2021/0312105 A1* | 10/2021 | Kishi | ..................... | G06F 30/13 |

\* cited by examiner

PIPE DIAMETER DIRECTION
PIPE AXIS DIRECTION

PIPE DIAMETER DIRECTION
PIPE AXIS DIRECTION

PIPE DIAMETER DIRECTION / PIPE AXIS DIRECTION

SEAL MEMBER AND PIPE JOINT USING THE SEAL MEMBER

FIELD OF THE INVENTION

The present invention relates to a seal member and a pipe joint using the seal member.

BACKGROUND OF THE INVENTION

A seal member 9 used in a pipe joint 900 shown in FIG. 9 is known. In the pipe joint 900, a spigot 3 formed at an end of one of pipes is inserted into a socket 2 formed at an end of the other pipe, to connect with each other.

A seal member 9, which is made of rubber and has annular shape, is placed in a seal member placement recess 20 formed in an inner circumference of the socket 2. As shown in FIGS. 9 and 10, the seal member 9 includes: a heel 93 fitted into a first setting groove 21 provided on an open side of the seal member placement recess 20 on the inner circumferential surface side of the socket 2; and a bulb-shaped portion 90 fitted into a second setting groove 22, provided on a deeper side of the socket 2 than the first setting groove 21, and configured to generate sealing surface pressure by being compressed between a sealing surface 23 on the inner circumferential surface and the outer circumferential surface of the spigot 3. FIG. 10 is a sectional view showing a state of the seal member 9 before the spigot 3 is inserted into the socket 2. As shown in FIG. 10, in the section, the bulb-shaped portion 90 has a height H91 along the radial direction of the bulb-shaped portion 90.

A pipe joint using such a seal member 9 is described in Japanese Patent No. 4836870.

A typically-known material for seal member 9 is a styrene-butadiene rubber (SBR) material. Recently, however, from the viewpoint of oil resistance, chemical resistance, and the like, there has been a demand for seal members formed of a high hardness material such as a nitrile-butadiene rubber (NBR) material. With increases in the hardness of the seal member 9, as shown in FIG. 9, when the seal member 9 is compressed, high stress may be produced on the seal member 9 in the interface A91 between the inner circumferential side of the seal member 9 and the outer circumferential surface of the spigot 3. FIG. 9 outlines results of a stress analysis conducted by a finite element method (FEM) using NBR for publicly-known seal member 9 shown in FIG. 10 to verify generated stress in a sealed state. In the illustrated section of the seal member 9, the black part is a high-stress area and the white part is a low-stress area.

The high stress is produced for the following reason in the process of creating a sealed state by inserting the spigot 3 into the socket 2 (details will be described later): when the bulb-shaped portion 90 shown in FIG. 10 is spread out toward the outer circumference as indicated by arrow D91, bending stress and tensile stress, in particular, increase on the inner circumferential side of the seal member 9 due to high hardness of the seal member 9 and thereby become residual in the sealed state.

To deal with this, a technique for relieving the generated stress is adopted, as shown in FIG. 11. A seal member 9*d* shown in FIG. 11 has a height H92 of a bulb-shaped portion 90*d* set lower than the height H91 of the bulb-shaped portion 90 of the seal member 9 shown in FIG. 10. Consequently, the bulb-shaped portion 90*d* of the seal member 9*d* is spread out toward the outer circumference as indicated by arrow D92 with a smaller amount of spread than the seal member 9 in FIG. 10, thereby making it possible to relieve high stress.

However, when the height H92 of the bulb-shaped portion 90*d* of the seal member 9*d* shown in FIG. 11 is lower than the height H91 of the bulb-shaped portion 90 of the seal member 9 shown in FIG. 10, compression allowance of the bulb-shaped portion 90*d* in the sealed state will decrease, which might reduce watertightness. Specifically, as shown in FIG. 12, when the distance between the socket 2 and the spigot 3 in the radial direction is relatively large, when water pressure WP acts on the seal member 9*d* from inside the pipe in the sealed state, sealing surface pressure of the seal member 9*d* is lost due to the water pressure WP, creating a gap G in an interface A92 between the outer circumferential side of the bulb-shaped portion 90*d* and the sealing surface 23 of the socket 2. Then, water might leak through the gap G. FIG. 12 shows results of a watertightness analysis conducted on the seal member 9*d*.

As described above, publicly-known seal members have a problem in that especially when the seal members are high in hardness, it is difficult to satisfy both a requirement of stress in a sealed state and a requirement of watertightness.

The present invention has been made in view of the above problems and has an object to obtain a seal member that satisfies both a requirement of stress during compression and a requirement of watertightness when used by being compressed between a sealing surface of a socket and the outer circumferential surface of a spigot.

SUMMARY OF THE INVENTION

A seal member according to the present invention is made of an elastic material, having an annular shape, and used for a pipe joint in which a spigot formed at an end of a first pipe is inserted into a socket formed at an end of a second pipe, the first pipe and the second pipe being connected with each other.

The seal member includes a bulb-shaped portion, which includes a first projecting portion formed on the outer circumferential side and a second projecting portion formed on the inner circumferential side.

In a section of the seal member:
the first projecting portion and the second projecting portion each have a circular arc-shaped outline;
a first circle and a second circle are defined, the first circle including the circular arc-shaped outline of the first projecting portion, the second circle including the circular arc-shaped outline of the second projecting portion;
a first radius of the first circle is smaller than a second radius of the second circle;
a center of the first circle is located within the second circle; and
a center distance between the center of the first circle and the center of the second circle in the axial direction of the seal member is smaller than the difference between the second radius and the first radius.

In the seal member according to the present invention, since the center of the first circle of the first projecting portion is located within the second circle of the second projecting portion, the second projecting portion comes sufficiently close to the first projecting portion. This makes it possible to inhibit deformation of the seal member caused by the bulb-shaped portion being spread out when the spigot is inserted into the socket, where the spigot and the socket make up the pipe joint in which the seal member is used. It is also possible to relieve the stress generated on the inner circumferential side of the seal member with the pipe joint being sealed. Since the center distance is set smaller than the difference between the second radius and the first radius, the center of the first circle of the first projecting portion and the center of the second circle of the second projecting portion of the pipe joint are lined up in almost the same straight line along the radial direction of the pipe joint. Consequently, the seal member according to the present invention efficiently develops a repulsive force in the bulb-shaped portion. As a result, the seal member can get sufficient sealing surface pressure and thereby ensure watertightness.

Preferably the seal member according to the present invention further includes a heel provided on the outer circumferential side of the bulb-shaped portion, wherein the inner circumferential surface of the heel and the inner circumferential surface of the second projecting portion are connected together via a slope.

With such a seal member, in the pipe joint, the slope is inclined inward in the pipe diameter direction along the direction in which the spigot is inserted into the socket. Consequently, when the spigot is inserted, the slope guides the tip of the spigot inward in the pipe diameter direction while efficiently spreading out the bulb-shaped portion outward of the pipe along with insertion of the spigot. This makes it possible to reduce the insertion force of the spigot.

Preferably, in the seal member according to the present invention, the center distance between the center of the first circle and the center of the second circle in the axial direction of the seal member is zero.

Consequently, when the seal member is fitted into the pipe joint, a repulsive force is efficiently developed in the bulb-shaped portion, and sufficient sealing surface pressure is provided. As a result, the seal member can improve watertightness.

Preferably, in the seal member according to the present invention, the length of a chord joining two points of intersection between the first circle and the second circle is equal to the diameter of the first circle.

According to this, when the seal member is fitted into the pipe joint, the sectional area of the bulb-shaped portion increases. This makes it possible to increase the repulsive force of the seal member, increasing the watertightness and reducing the insertion force of the spigot.

DETAILED DESCRIPTION OF THE INVENTION

A seal member 1 according to an embodiment of the present invention will be described with reference to the accompanying drawings.

A pipe joint 100 that uses the seal member 1 according to the embodiment of the present invention will be described with reference to FIG. 1.

Figure 1:
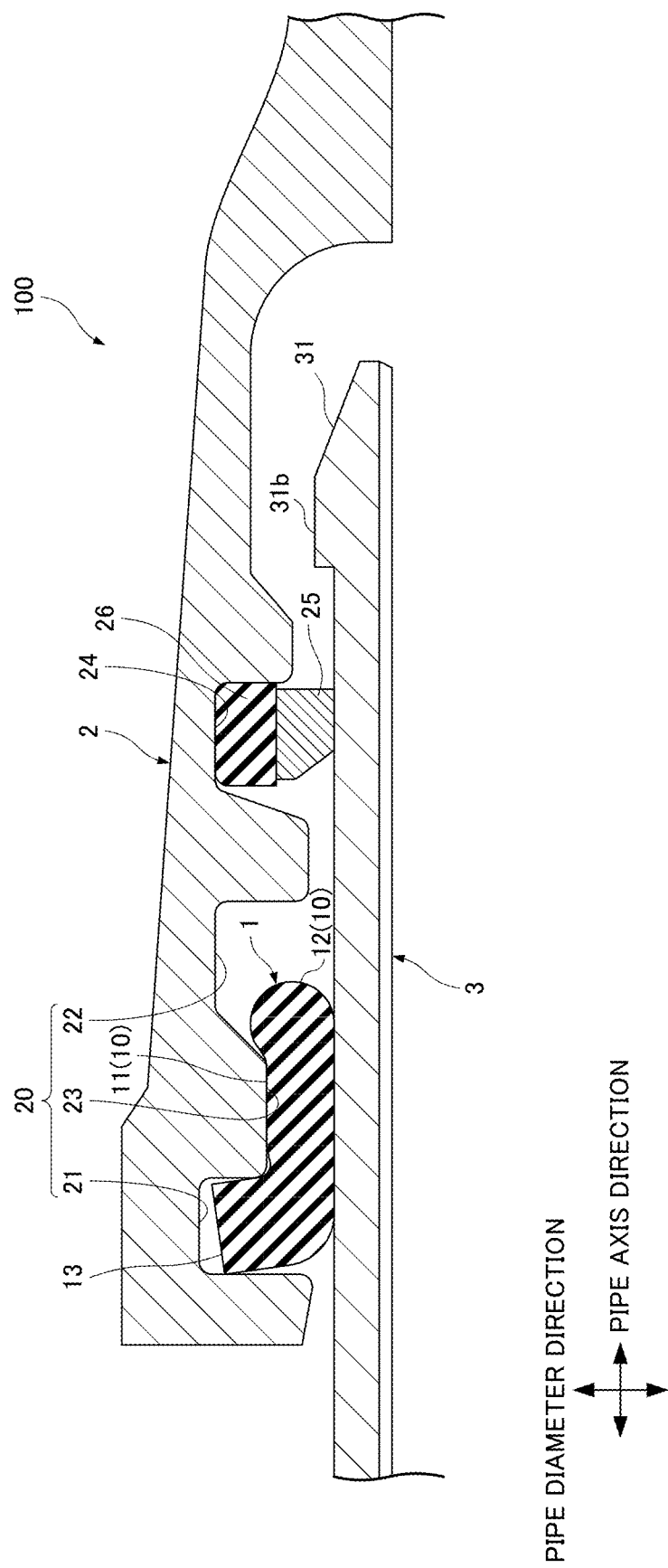
FIG. 1 is a longitudinal sectional view of a pipe joint using a seal member according to an embodiment of the present invention.

As shown in FIG. 1, the pipe joint 100 includes: a spigot 3 formed at an end of a first pipe; a socket 2 formed at an end of a second pipe and adopted to accept insertion of the spigot 3, the first pipe and the second pipe being connected with each other; and a seal member 1 made of an elastic material such as rubber, having an annular shape, and used to seal the spacing between the socket 2 and the spigot 3 by being interposed therebetween.

A seal member placement recess 20 on which the seal member 1 is placed and a lock ring accommodation groove 24 located on the deeper side of the socket 2 than the recess 20 are formed all around the inner circumferential surface of the socket 2. A lock ring 25 having one slit in its circumference is fitted into the lock ring accommodation groove 24. A protrusion 31b capable of getting engaged with the lock ring 25 from the deeper side of the socket 2 is formed all around the outer circumference of a tip 31 of the spigot 3. The tip 31 of the spigot 3 is tapered down from the outer circumferential surface of the protrusion 31b toward the leading edge of the spigot 3, inclining inward in the pipe diameter direction. An elastic member 26 for use to center the lock ring 25 is placed between the lock ring 25 and the bottom of the lock ring accommodation groove 24.

On the inner circumferential surface of the seal member placement recess 20, a first setting groove 21, which is an example of a "setting groove," a sealing surface 23, and a second setting groove 22 range from an open end of the socket 2 toward the deeper side. All of the first setting groove 21, sealing surface 23, and second setting groove 22 are formed all around the socket 2. The sealing surface 23 is smaller in inside diameter than the first setting groove 21 and the second setting groove 22.

The seal member 1 generates sealing surface pressure by being compressed between the sealing surface 23 of the socket 2 and the outer circumferential surface of the spigot 3.

The seal member 1 will be described with reference to FIGS. 1 and 2.

Figure 2:
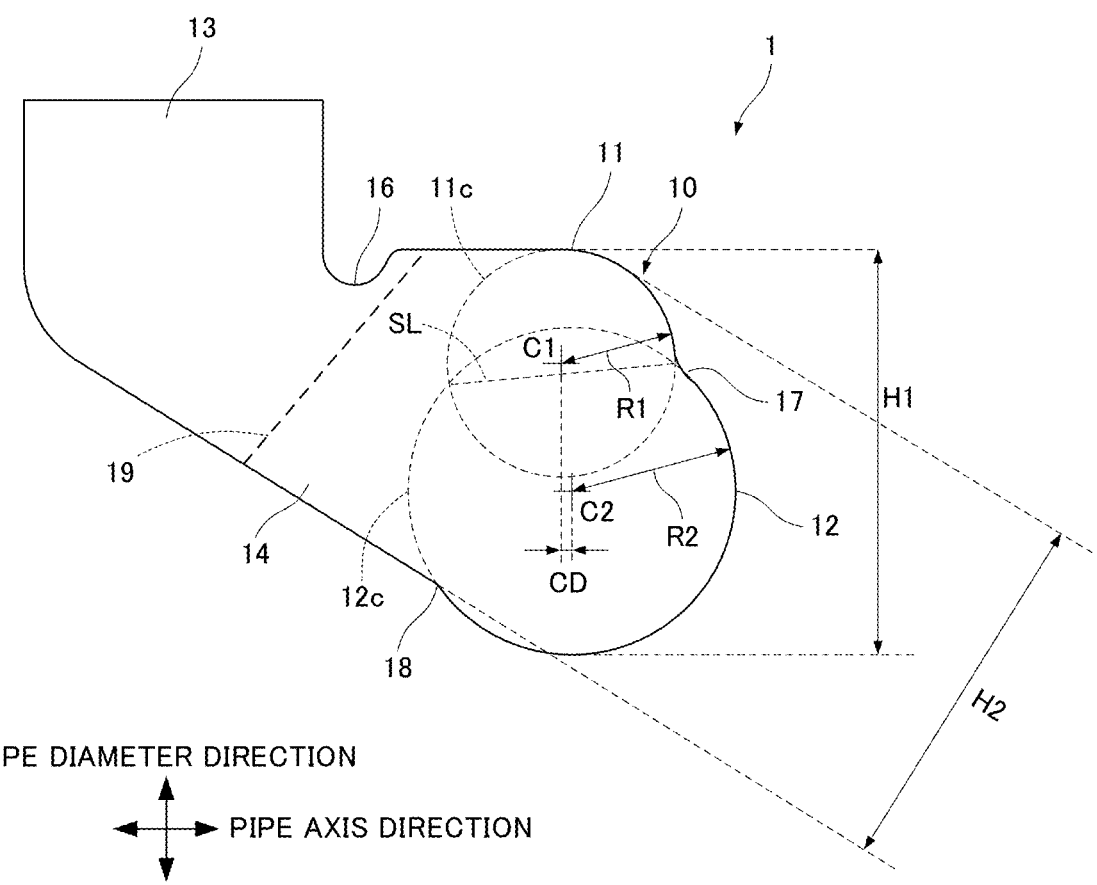
FIG. 2 is a sectional view of the seal member not fitted into the pipe joint.

As shown in FIG. 2, the seal member 1, which is annular in shape, includes: a heel 13 fitted into the first setting groove 21; a bulb-shaped portion 10 linked to the heel 13 in the pipe axis direction of the pipe joint 100 and compressed between the sealing surface 23 of the socket 2 and the outer circumferential surface of the spigot 3; a tapered portion 14 which, being an example of a slope, connects the inner circumferential surface of the heel 13 and the inner circumferential surface of the bulb-shaped portion 10; and first, second, and third recesses 16, 17, 18. All of these components are formed all around the circumference of the seal member 1.

The bulb-shaped portion 10 includes a first bulb-shaped portion 11, which is annular in shape and is an example of a first projecting portion formed on the outer circumferential side, and a second bulb-shaped portion 12, which is annular in shape and is an example of a second projecting portion formed on the inner circumferential side. The first bulb-shaped portion 11 and the second bulb-shaped portion 12 are formed all around the bulb-shaped portion 10, with the first bulb-shaped portion 11 protruding outward in the radial direction of the seal member 1 and the second bulb-shaped portion 12 protruding inward in the radial direction of the seal member 1. Hereinafter, the distance between the outer end of the first bulb-shaped portion 11 and the inner end of the second bulb-shaped portion 12 in the radial direction of the seal member 1 will be referred to as a first bulb height H1.

As illustrated, the first bulb-shaped portion 11 and the second bulb-shaped portion 12 have arc-shaped outlines and the arc shape of the first bulb-shaped portion 11 is included in a first circle 11c while the arc shape of the second bulb-shaped portion 12 is included in a second circle 12c.

A center C1 of the first circle is located within the second circle 12c. A first radius R1 of the first circle C1 is smaller than a second radius R2 of the second circle 12c.

When the seal member 1 is fitted into the pipe joint 100, the center C1 of the first circle is located inward of the sealing surface 23 of the socket 2 in the pipe diameter direction. That is, the first bulb-shaped portion 11 is placed in the vicinity of the sealing surface 23.

A center distance CD between the center C1 of the first circle 11c and the center C2 of the second circle 12c in the axial direction of the seal member 1 is set smaller than the difference between the second radius R2 and the first radius R1 (hereinafter referred to as a "radial difference"). Consequently, when the seal member 1 is fitted into the pipe joint 100, the center C1 of the first circle 11c and the center C2 of the second circle 12c are lined up in almost the same straight line along the radial direction of the pipe joint 100 although details will be described later.

The heel 13 is an annular member shaped square in section. The tapered portion 14 has a slope continuously reducing in diameter toward the inner circumferential surface of the second bulb-shaped portion 12 from the inner circumferential surface of the heel 13. The slope is formed all around the seal member 1, thereby connecting the heel 13 and the bulb-shaped portion 10. The heel 13 is formed of an elastic member generally higher in hardness than the bulb-shaped portion 10.

The heel 13 and the bulb-shaped portion 10 are integrated via a junction plane 19. Hereinafter, the height of the first bulb-shaped portion 11 from the slope of the tapered portion 14 will be referred to as a second bulb height H2.

The first recess 16, the second recess 17, and the third recess 18 are each arc-shaped in section and formed all around the bulb-shaped portion 10. The first recess 16 is formed between the heel 13 and the first bulb-shaped portion 11, the second recess 17 is formed between the first bulb-shaped portion 11 and the second bulb-shaped portion 12, and the third recess 18 is formed between the second bulb-shaped portion 12 and the tapered portion 14.

Functions of the seal member 1 will be described.

With reference to FIGS. 3A to 3D, description will be given of the process whereby the spigot 3 is inserted into the socket 2 of the pipe joint 100 as well as the action of stress at that time.

Figure 3A:
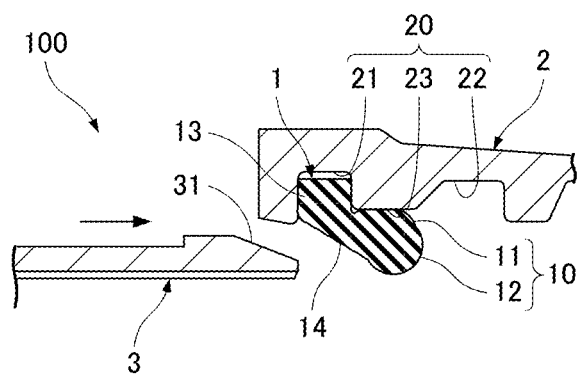
FIG. 3A is a longitudinal sectional view of the pipe joint, showing procedures for joining a spigot to a socket.
Figure 3B:
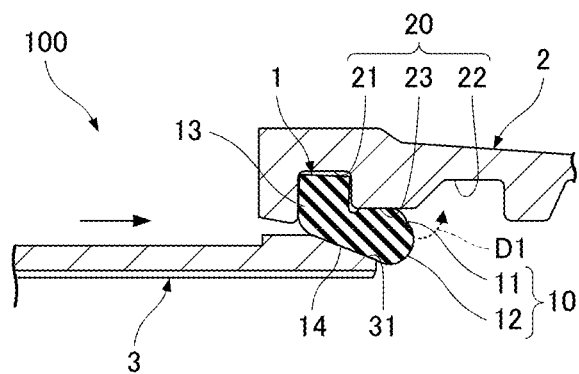
FIG. 3B is a longitudinal sectional view of the pipe joint, showing the joining procedures following that of FIG. 3A.

FIG. 3A shows a state in which the spigot 3 is yet to be inserted into the socket 2. Then, the spigot 3 is inserted into the socket 2 as shown in FIG. 3B. Consequently, the outer circumferential surface of the tip 31 of the spigot 3 contacts the inner circumferential surface of the tapered portion 14 of the seal member 1. The inner circumferential surface of the tapered portion 14 inclines inward in the pipe diameter direction by being reduced in diameter along the insertion direction of the spigot 3. Therefore, the second bulb-shaped portion 12 is spread out toward the deeper side in the inner circumference of the socket 2 (arrow D1 in FIG. 3B) by the outer circumferential surface of the tip 31.

Subsequently, in the process in which the insertion of the spigot 3 shown in FIG. 3C proceeds, the tip 31 of the spigot 3 is inclined toward the inner side of the pipe relative to the insertion direction, and thus, the bulb-shaped portion 10 receives acting forces in the pipe axis direction and the pipe diameter direction from the tip 31 of the spigot 3. Consequently, the insertion of the spigot 3 causes the bulb-shaped portion 10 to be compressed toward the sealing surface 23 of the socket 2 in the pipe diameter direction and stretched in the pipe axis direction toward the deeper side of the socket 2. Then, as shown in FIG. 3D, when the tip 31 of the spigot 3 has fully passed through the second bulb-shaped portion 12, the insertion is complete. As a result, the first bulb-shaped portion 11 is pressed by the sealing surface 23 of the socket 2 and the second bulb-shaped portion 12 is pressed by the outer circumferential surface of the spigot 3, thereby causing the spacing between the socket 2 and the spigot 3 to be sealed by the seal member 1. In so doing, the second bulb-shaped portion 12 fits into the second setting groove 22, thereby preventing the seal member 1 from falling out toward the open side of the socket 2. This makes it possible for the seal member 1 to provide stable sealing performance.

Figure 3C:
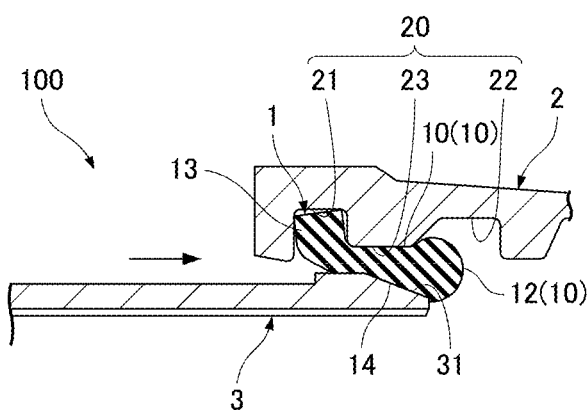
FIG. 3C is a longitudinal sectional view of the pipe joint, showing the joining procedures following that of FIG. 3B.
Figure 3D:
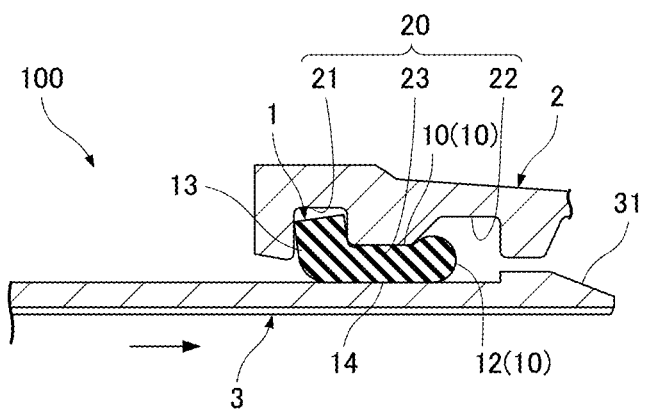
FIG. 3D is a longitudinal sectional view of the pipe joint, showing the joining procedures following that of FIG. 3C.
Figure 10:
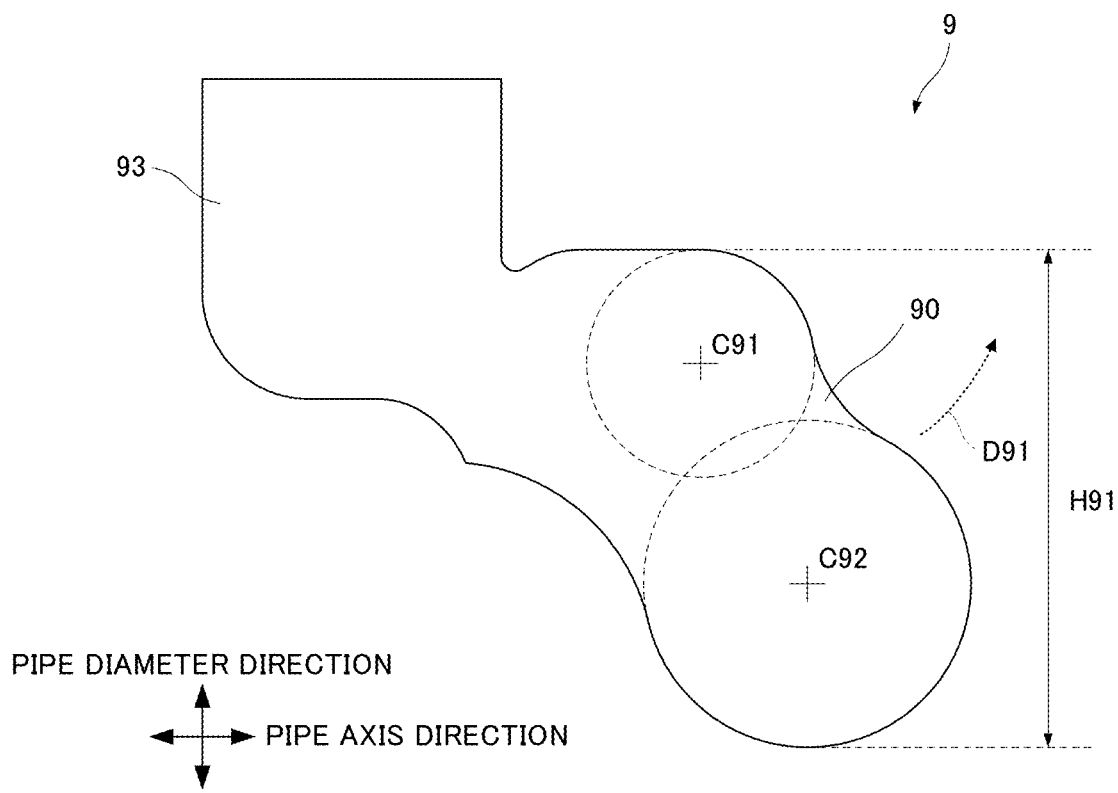
FIG. 10 is a sectional view of a publicly-known seal member not fitted into a pipe joint.

In the process of transition from the state of FIG. 3B to the state of FIG. 3C, the first bulb-shaped portion 11 and the second bulb-shaped portion 12 approach each other in the pipe diameter direction. In so doing, since the center C1 of the first circle 11c of the first bulb-shaped portion 11 is located in the second circle 12c of the second bulb-shaped portion 12 as shown in FIG. 2, when the second bulb-shaped portion 12 is spread out in the direction of arrow D1 as shown in FIG. 3B, the amount by which the second bulb-shaped portion 12 is spread out is smaller than a publicly-known seal member 9. (see FIG. 10). That is, the seal member 1 has only a small amount of bending toward the inner circumferential side and only a small amount of pull. Consequently, the seal member 1 can relieve the stress generated on the inner circumferential side of the seal member 1 in the sealed state shown in FIG. 3D.

Since the center C1 of the first circle 11c of the first bulb-shaped portion 11 is located in the second circle 12c of the second bulb-shaped portion 12 as shown in FIG. 2, the center C1 of the first circle and the center C2 of the second circle come close to each other, making it possible to increase the length SL of the chord joining two points of intersection between the first circle 11c and the second circle 12c. This increases the sectional area of the bulb-shaped portion 10, allowing the seal member 1 to increase the repulsive force of the bulb-shaped portion 10 when compressed.

However, if the center C1 of the first circle and the center C2 of the second circle come too close to each other along the radial direction, the first bulb height H1 and second bulb height H2 of the bulb-shaped portion 10 are decreased, thereby reducing the compression allowance of the bulb-shaped portion 10. Thus, desirably, the center C1 of the first circle is close to the center C2 of the second circle only to the extent that the sealing surface pressure of the bulb-shaped portion 10 can be secured.

Specifically, it is most preferable that the first circle 11c and the second circle 12c are placed such that the diameter and chord length SL of the first circle 11c will become equal to each other as the center C1 of the first circle 11c and the center C2 of the second circle 12c approach each other. This allows the seal member 1 to obtain a sufficient repulsive force because of an increased sectional area of the bulb-shaped portion 10 and prevent reduction in compression allowance. As a result, the seal member 1 can satisfy both a stress-related requirement and a watertightness-related requirement.

With the seal member 1, since the second radius R2 of the second circle 12c is larger than the first radius R1 of the first circle 11c and the inside diameter of the sealing surface 23 of the socket 2 is smaller than the inside diameter of the second setting groove 22, in the process of transition from the state of FIG. 3C to the state of FIG. 3D, it becomes difficult for the second bulb-shaped portion 12 to get out of being fitted into the second setting groove 22.

Figure 4A:
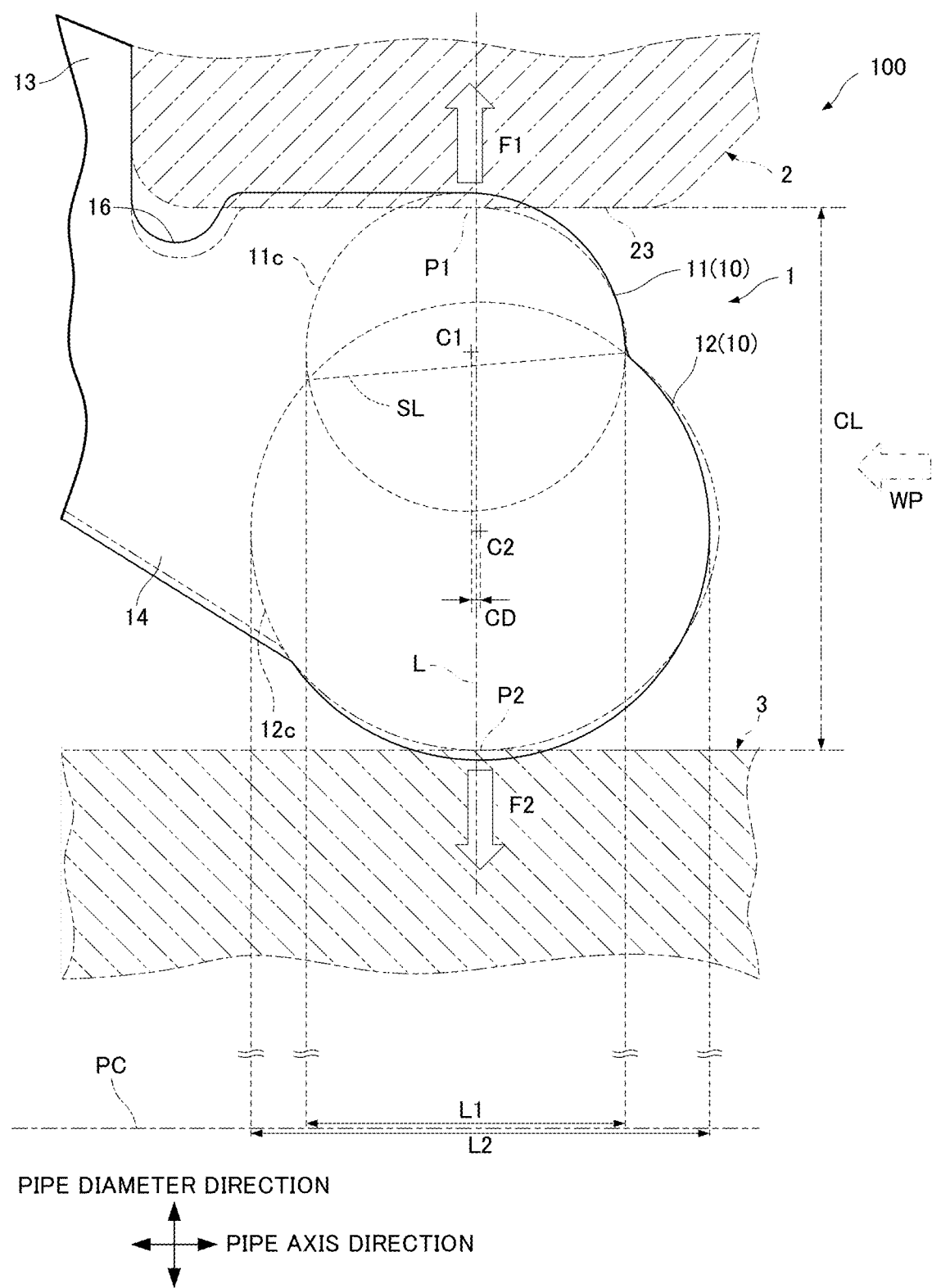
FIG. 4A is a longitudinal sectional view of the pipe joint in a state free of water pressure in a watertightness analysis.
Figure 4B:
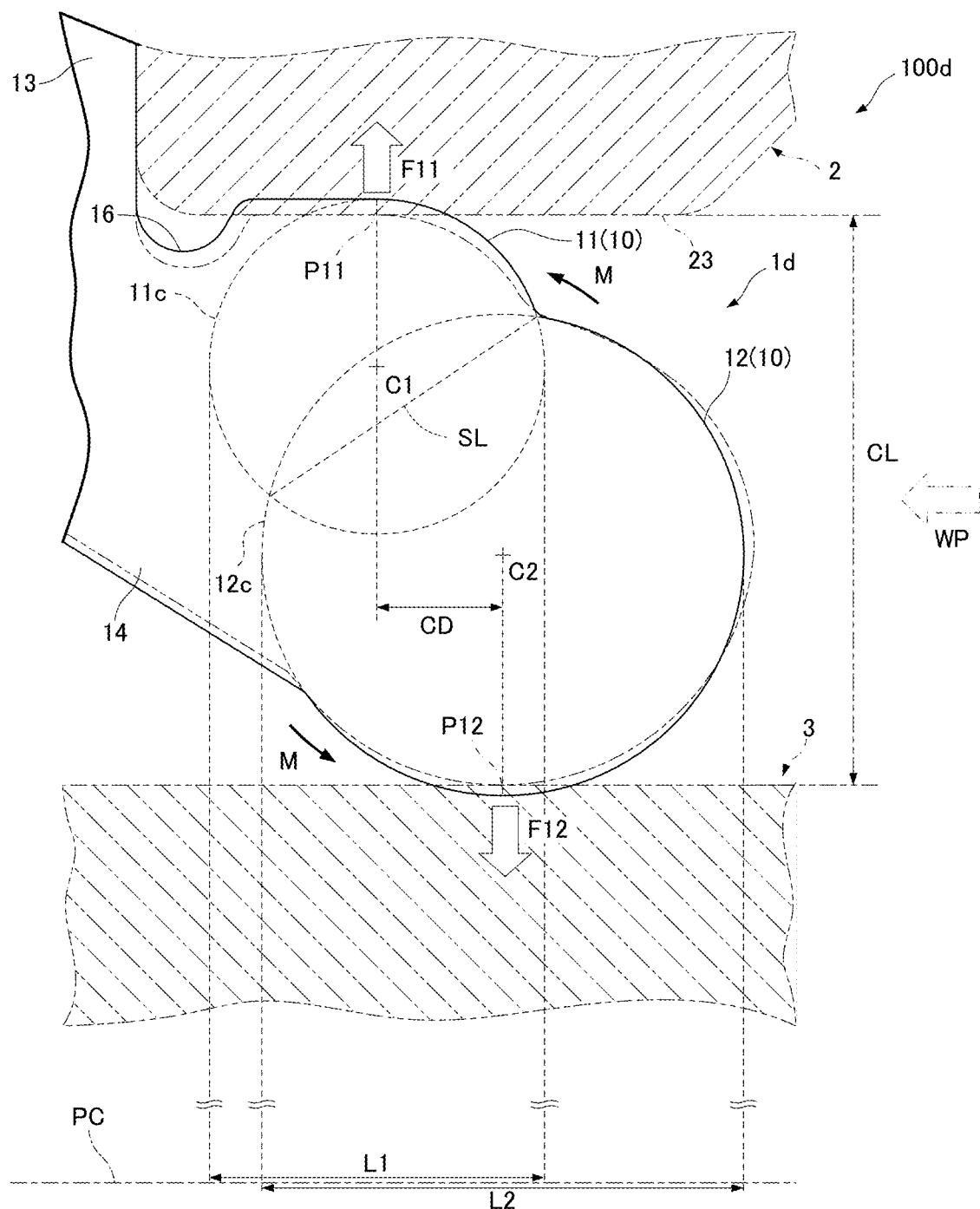
FIG. 4B is a longitudinal sectional view of a pipe joint using a publicly-known seal member in a state free of water pressure in a watertightness analysis.

With reference to FIGS. 4A and 4B as well as FIG. 2, watertightness will be described.

FIGS. 4A and 4B are longitudinal sectional views of principal parts of pipe joints 100 and 100d in a state free of water pressure WP. Of these drawings, FIG. 4A shows a case in which the seal member 1 according to the present invention is used, where the solid line indicates the form of the seal member 1 before being fitted into the pipe joint 100 and the imaginary line indicates the form of the seal member 1 acting as a seal after being fitted into the pipe joint 100. FIG. 4B shows a case in which another seal member 1d that does not satisfy constituent features of the seal member 1 according to the present invention is used.

Figure 5:
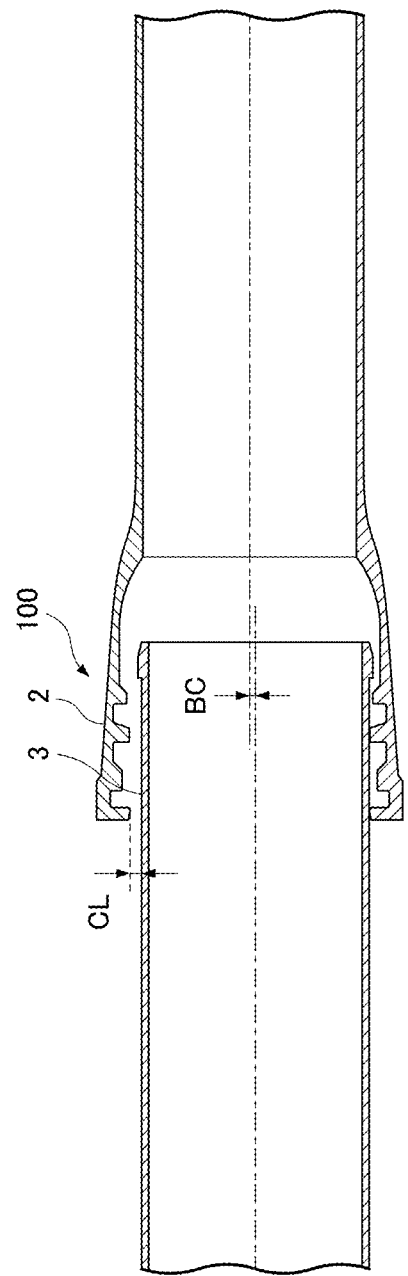
FIG. 5 is a diagram showing analysis conditions for a watertightness analysis.

As shown in FIG. 5, a watertightness analysis is conducted when vertical misalignment BC occurs between the pipe axis of the socket 2 of the pipe joint 100 placed in the horizontal direction and the pipe axis of the spigot 3 placed in the horizontal direction, maximizing a clearance CL between the upper end of the socket 2 of the pipe joint 100 and the upper end of the spigot 3. In so doing, as indicate by the imaginary line in FIG. 4A, if the clearance CL is at its maximum, at the illustrated upper end position in the circumferential direction of the pipe joint 100, the bulb-shaped portion 10 of the seal member 1 is in a low compression condition, being not compressed much. The seal member 1 is required to satisfy watertightness in the low compression condition.

In so doing, the first circle 11c and the second circle 12c are provided on the seal member 1 such that the center distance CD between the circles 11c and 12c will be smaller than the radial difference between the second radius R2 and the first radius R1 shown in FIG. 2. Consequently, as shown in FIG. 4A, a projection line L1 of the first circle 11c onto a pipe axis PC is within a range of a projection line L2 of the second circle 12c onto the pipe axis PC. In other words, in the pipe axis direction, the first circle 11c is located inside the second circle 12c. As a result, the center C1 of the first circle and the center C2 of the second circle are lined up in almost the same straight line L along the pipe diameter direction. Preferably, the centers C1 and C2 are lined up in completely the same straight line L. Thus, on the seal member 1, a point P1 of application of a repulsive force F1 produced by the first bulb-shaped portion 11 to the sealing surface 23 and a point P2 of application of a repulsive force F2 produced by the second bulb-shaped portion 12 to the outer circumferential surface of the spigot 3 are lined up in almost the same straight line L in the pipe diameter direction. This makes it possible to increase the repulsive forces F1 and F2 of the bulb-shaped portion 10. As a result, the seal member 1 can provide sufficient sealing surface pressure and thereby ensure watertightness.

On the other hand, when the center distance CD is larger than the radial difference as shown in FIG. 4B, i.e., when part of the projection line L1 of the first circle 11c onto the pipe axis PC is not contained within the range of the projection line L2 of the second circle 12c onto the pipe axis PC as illustrated, or in other words, when part of the first circle 11c gets out of the second circle 12c in the pipe axis direction, the center C1 of the first circle and the center C2 of the second circle are placed by being offset from each other in the pipe axis direction. As can be seen from FIGS. 10 and 11, the publicly-known seal members 9 and 9d are configured as follows: respective center distances between centers C91 and C91d of the first circle and the centers C92 and C92d of the second circle are larger than the radial difference, and consequently the centers C91 and C91d of the first circle and the centers C92 and C92d of the second circle are placed by being offset from each other in the pipe axis direction. In the case of the bulb-shaped portion 10 configured as described here and shown in FIG. 4B, when the bulb-shaped portion 10 is compressed as indicated by the imaginary line in FIG. 4B, the amount of offset in the pipe axis direction between a point P11 of application of a repulsive force F11 produced by the first bulb-shaped portion 11 to the sealing surface 23 and a point P12 of application of a repulsive force F12 produced by the second bulb-shaped portion 12 to the outer circumferential surface of the spigot 3 is larger. This increases rotation moment M acting on the bulb-shaped portion 10. As a result, with the seal member 1d that is shown in FIG. 4B, the repulsive forces F11 and F12 of the bulb-shaped portion 10 are smaller than the repulsive forces F1 and F2 of the seal member 1 shown in FIG. 4A, which might make it impossible to provide sufficient sealing surface pressure.

Figure 6:
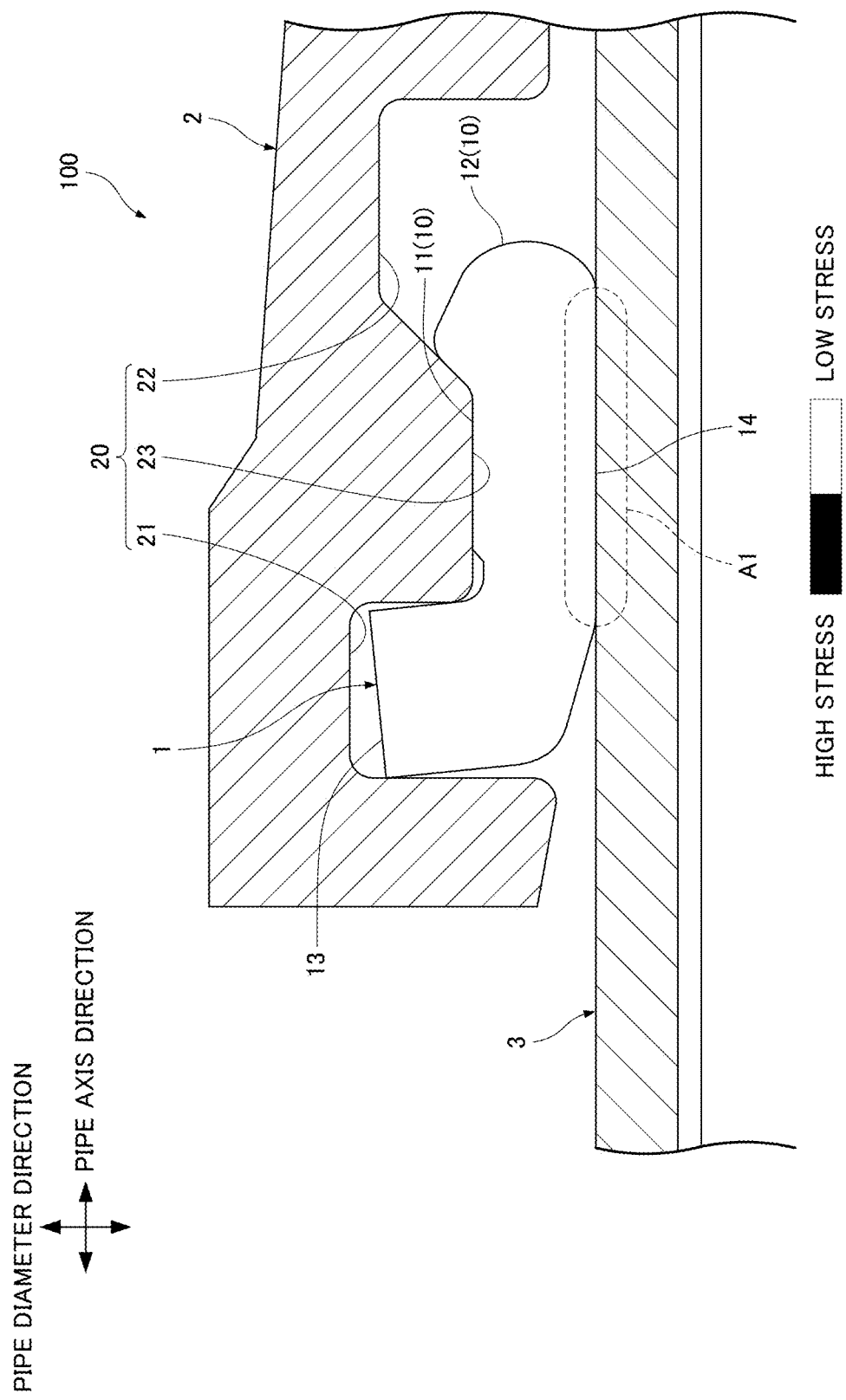
FIG. 6 is a diagram showing an example of stress analysis results on the seal member according to the embodiment of the present invention.
Figure 7:
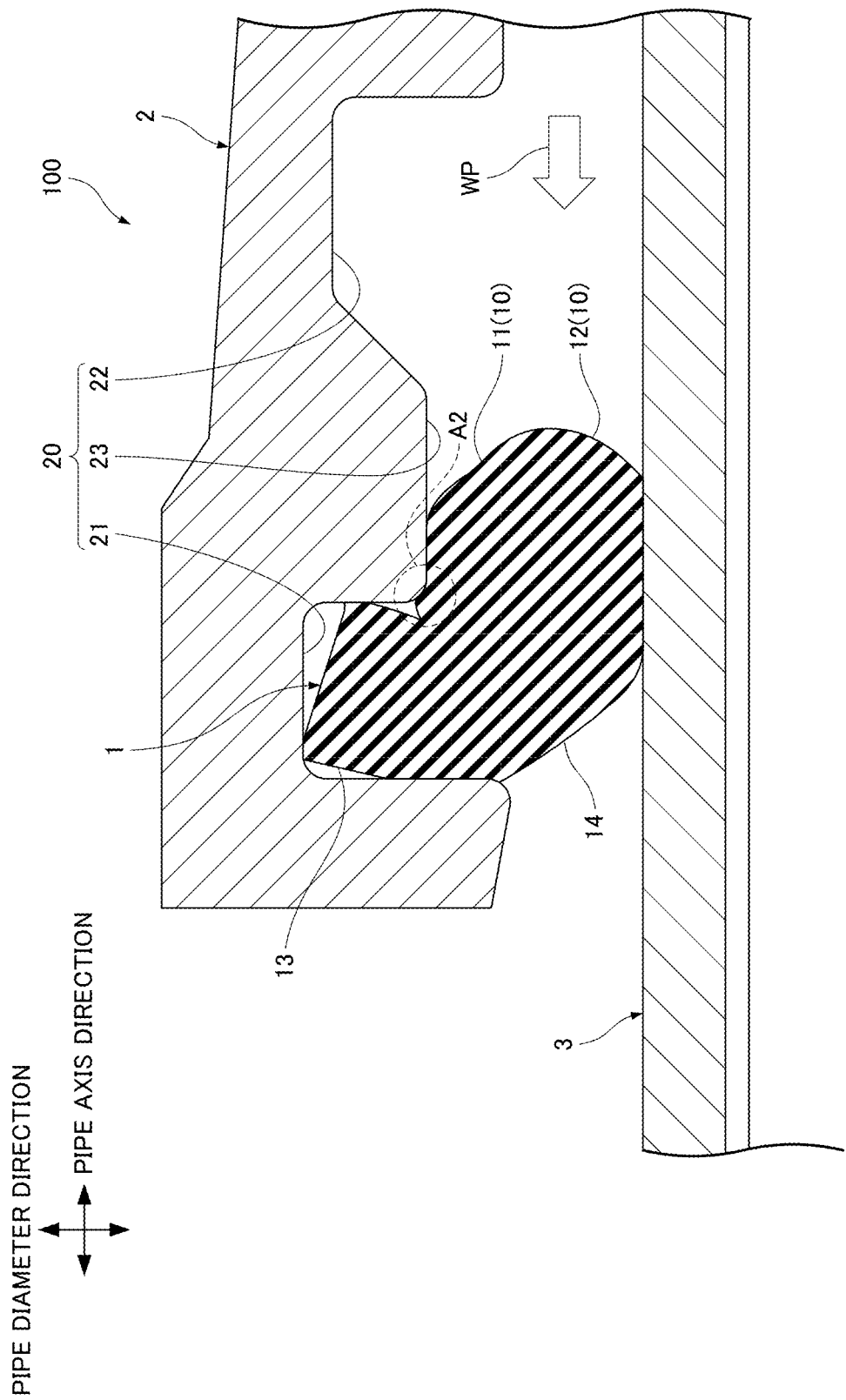
FIG. 7 is a diagram showing an example of watertightness analysis results on the seal member according to the embodiment of the present invention under water pressure.

With reference to FIGS. 6 and 7, effects of the operations will be described in detail.

Figure 9:
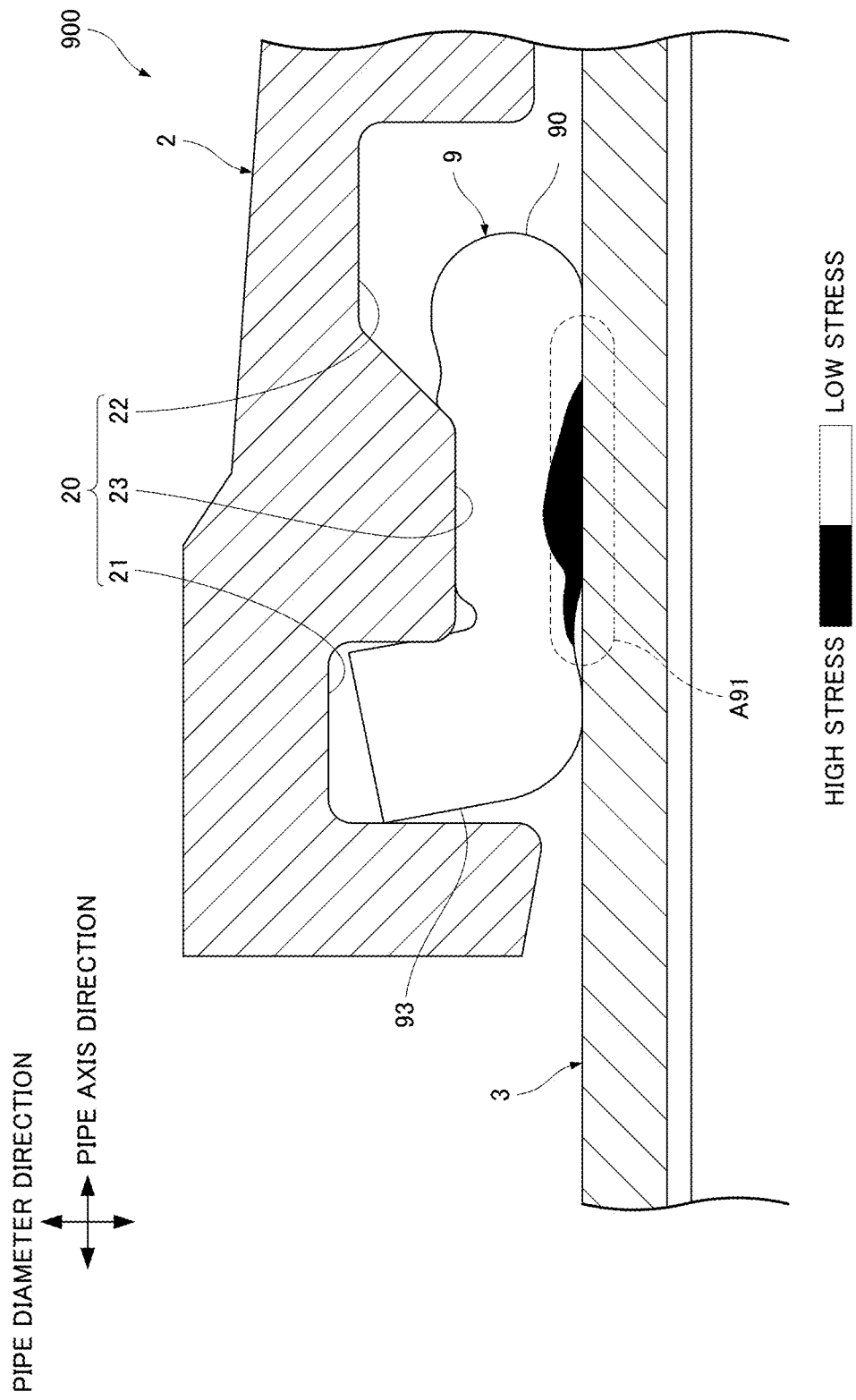
FIG. 9 is a longitudinal sectional view of a pipe joint using a publicly-known seal member.

According to the FEM analysis results shown in FIG. 6, i.e., results of the FEM analysis on the stress acting on the seal member 1, of the bending stress and tensile stress produced in an interface A1 between the inner circumferential side of the seal member 1 and the outer circumferential surface of the spigot 3, the stress generated on the inner circumferential side of the seal member 1 is relieved compared to the case of the publicly-known seal member 9 shown in FIG. 9. Specifically, the analysis results show that the maximum stress generated in the interface A1 is reduced greatly (by 47%) compared to the case of the publicly-known seal member 9 shown in FIG. 9. Therefore, as illustrated, high stress is not generated in the interface A1, and only a low-stress region exists.

Figure 12:
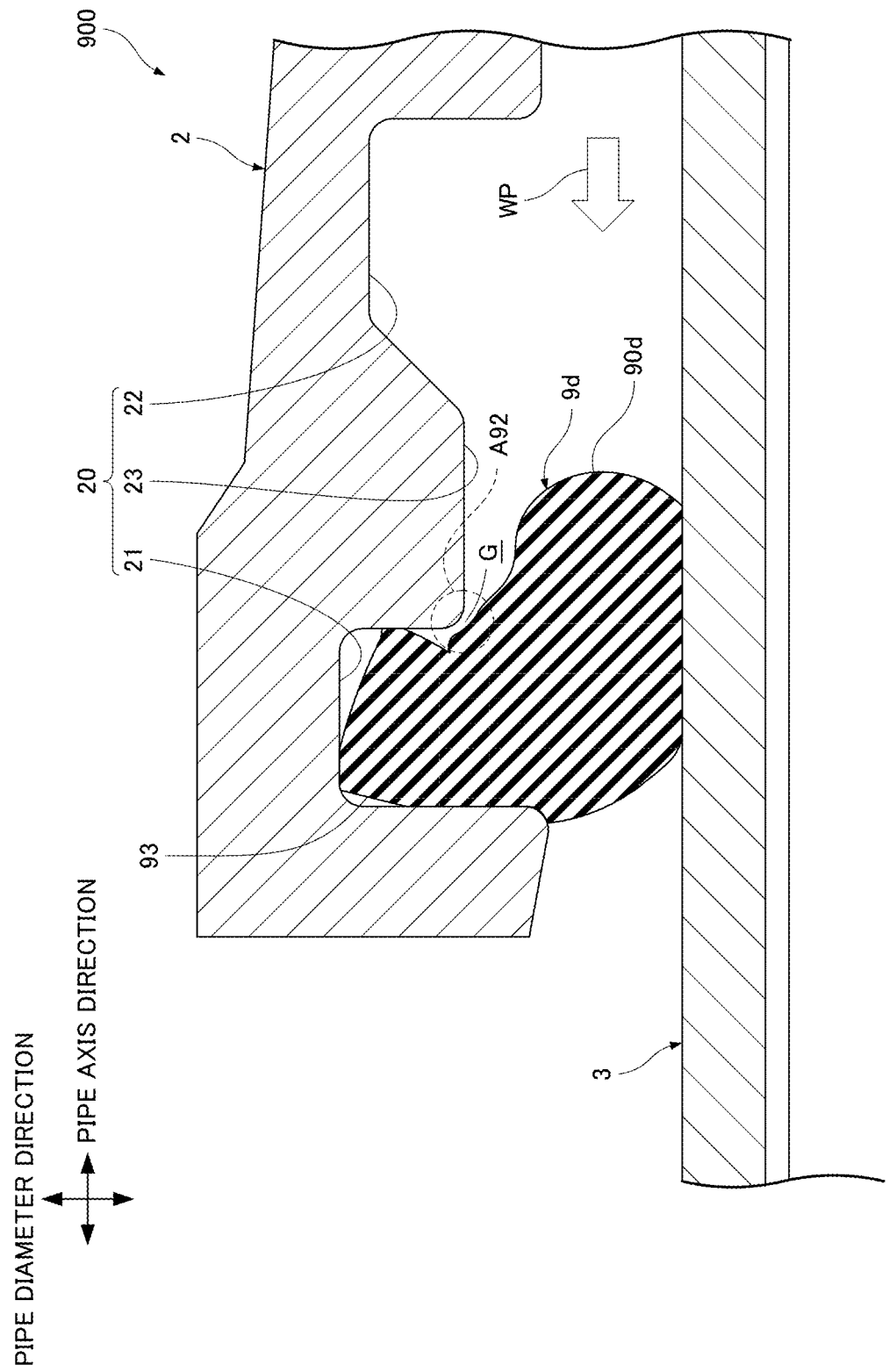
FIG. 12 is a diagram showing an example of watertightness analysis results on the seal member shown in FIG. 11.

According to the watertightness analysis results shown in FIG. 7, i.e., results of the analysis on the watertightness of the seal member 1, even if water pressure WP is applied to an interface A2 between the first bulb-shaped portion 11 and the sealing surface 23 of the socket 2, a gap G (see FIG. 12) such as observed in the publicly-known seal member 9d is not produced. Therefore, the seal member 1 satisfies the watertightness-related requirement.

When the insertion force necessary to insert the spigot 3 into the socket 2 in the process of joining pipes together is analyzed, the maximum insertion force against the resistance of the seal member 1 is slightly larger (by 4%) than the maximum insertion force of a publicly-known seal member, but almost equal. Thus, the seal member 1 also satisfies a requirement related to insertion force.

As described above, the seal member 1 can satisfy a requirement related to insertion force as well as satisfy both a requirement related to generated stress and a requirement related to watertightness.

VARIATION

Contrary to the illustration in FIG. 2, the outer surface of the tapered portion 14 of the seal member 1 does not have to be formed rectilinearly, continuing from the heel 13 in section. That is, the seal member may be configured to have a recess in section as with a seal member 4 shown in FIG. 8, which is a variation of the seal member 1 according to the embodiment of the present invention.

Figure 8:
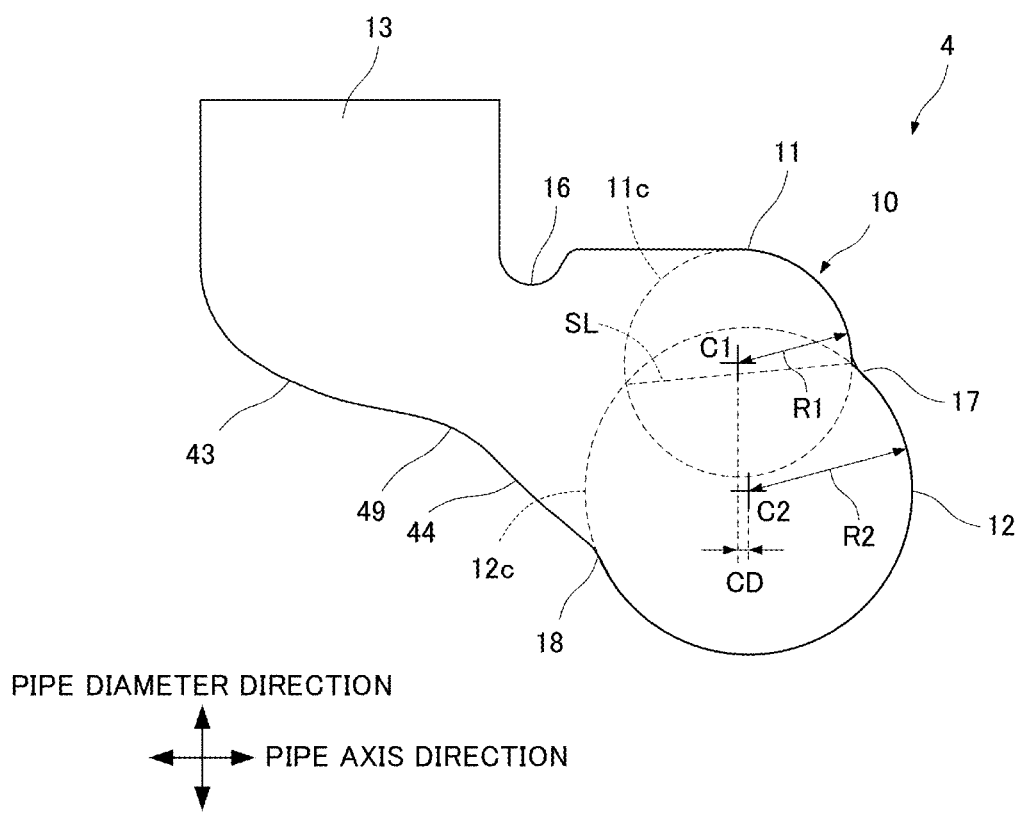
FIG. 8 is a sectional view of a variation of the seal member according to the embodiment of the present invention when the seal member is not fitted into the pipe joint.

As shown in FIG. 8, compared to the seal member 1 described above, the seal member 4 further includes a third bulb-shaped portion 43 and a fourth recess 49. A tapered portion 44 of the seal member 4 differs in sectional shape from the tapered portion 14 of the seal member 1 shown in FIG. 2. The third bulb-shaped portion 43 is formed on the inner circumferential side of the heel 13. The tapered portion 44 is a slope continuously reduced in diameter toward the inner circumferential surface of a second bulb-shaped portion 42 from an inner circumferential part of the third bulb-shaped portion 43. The tapered portion 44 is formed all around the seal member 4, and connects the third bulb-shaped portion 43 and the second bulb-shaped portion 42. The fourth recess 49 is formed all around the seal member 4, between the third bulb-shaped portion 43 and the tapered portion 44.

Figure 11:
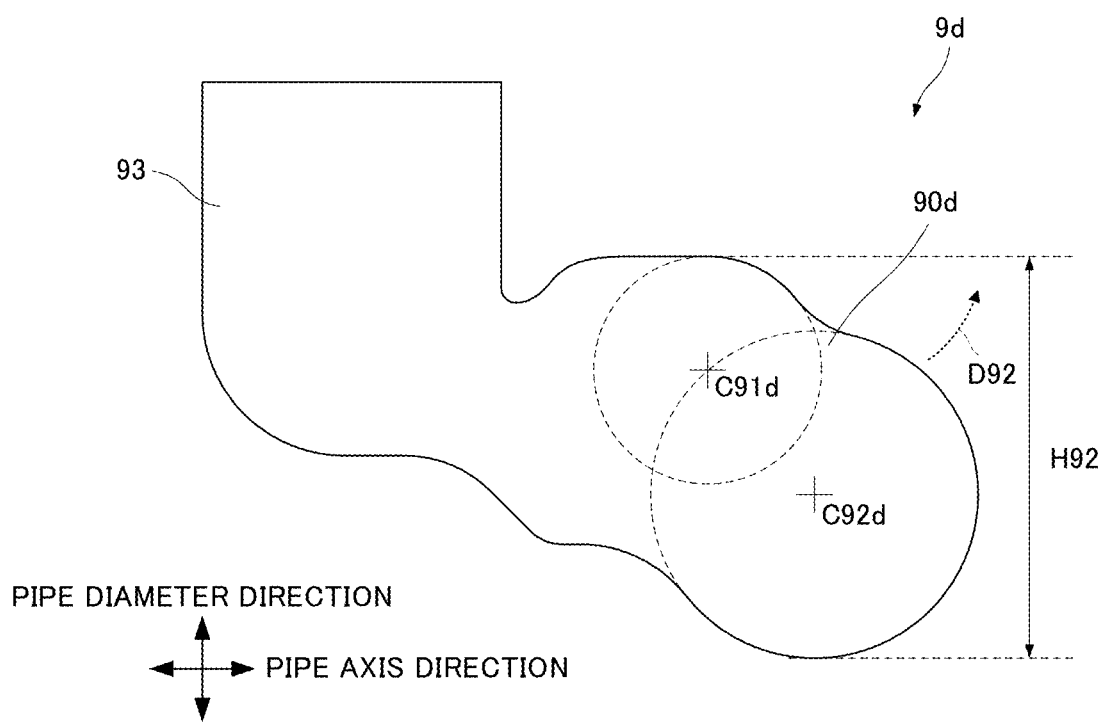
FIG. 11 is a sectional view of a publicly-known new seal member, which is an improvement of a publicly-known old seal member.

Even if the seal member 4 is configured as described above, since the first bulb-shaped portion 11 and the second bulb-shaped portion 12 are configured as described above, the seal member 4 achieves operations and effects similar to those of the seal member 1. Specifically, in an FEM stress analysis similar to the one described above, maximum stress is reduced greatly (by 26%) compared to the case of the publicly-known seal member 9. In watertightness analysis results, a gap G (see FIG. 12) such as observed in the publicly-known seal member 9d shown in FIG. 11 is not formed either. Regarding analysis results on insertion force, the maximum insertion force against the resistance of the seal member 4 is 6.7 kN, which is equivalent to the maximum insertion force (6.5 kNPa) of the publicly-known seal member 9. That is, as with the seal member 1, the seal member 4 satisfies both a stress-related requirement and a watertightness-related requirement.

What is claimed is:

1. A seal member made of an elastic material, having an annular shape, and used for a pipe joint in which a spigot formed at an end of a first pipe is inserted into a socket formed at an end of a second pipe, the first pipe and the second pipe being connected with each other, the seal member comprising:
   a bulb-shaped portion, which includes a first projecting portion formed on an outer circumferential side and a second projecting portion formed on an inner circumferential side,
   wherein, in a section of the seal member:
   the first projecting portion and the second projecting portion each have a circular arc-shaped outline;
   a first circle and a second circle are defined, the first circle including the circular arc-shaped outline of the first projecting portion, the second circle including the circular arc-shaped outline of the second projecting portion;
   a first radius of the first circle is smaller than a second radius of the second circle;
   a center of the first circle is located within the second circle; and
   a center distance between the center of the first circle and the center of the second circle in an axial direction of the seal member is smaller than a difference between the second radius and the first radius.

2. The seal member according to claim 1, further comprising:
   a heel provided on the outer circumferential side of the bulb-shaped portion,
   wherein an inner circumferential surface of the heel and an inner circumferential surface of the second projecting portion are connected together via a slope.

3. The seal member according to claim 1, wherein a center distance between the center of the first circle and the center of the second circle in the axial direction of the seal member is zero.

4. The seal member according to claim 1, wherein a length of a chord joining two points of intersection between the first circle and the second circle is equal to a diameter of the first circle.

5. A pipe joint that joins a first pipe and a second pipe, the pipe joint comprising:
   a spigot formed at an end of the first pipe and provided with an outer circumferential surface;
   a socket formed at an end of the second pipe and adopted to accept insertion of the spigot, the socket comprising:
   a setting groove formed in an inner circumference of the socket; and
   a sealing surface provided at a deeper side of the socket than the setting groove of the inner circumference of the socket and having an inside diameter smaller than an inner diameter of the setting groove; and
   a seal member having an annular shape and used to seal a space between the socket and the spigot, the seal member comprising:
   a heel fitted into the setting groove; and
   a bulb-shaped portion to be compressed between the sealing surface and the outer circumferential surface of the spigot, the bulb-shaped portion comprising:
   a first projecting portion formed on an outer circumferential side of the bulb-shaped portion; and
   a second projecting portion formed on an inner circumferential side of the bulb-shaped portion,
   wherein, in a section of the seal member, in a state where the seal member is accommodated in the socket and the heel is fitted into the setting groove, but before the spigot is inserted into the socket:
   the first projecting portion and the second projecting portion each have a circular arc-shaped outline;
   a first circle and a second circle are defined, the first circle including the circular arc-shaped outline of the first projecting portion, the second circle including the circular arc-shaped outline of the second projecting portion;

a first radius of the first circle is smaller than a second radius of the second circle;

a center of the first circle is located within the second circle; and a center distance between the center of the first circle and the center of the second circle in an axial direction of the seal member is smaller than a difference between the second radius and the first radius.

6. The pipe joint according to claim 5, wherein:

an inner circumferential surface of the heel and an inner circumferential surface of the second projecting portion are connected together via a slope; and the slope inclines inward in a pipe diameter direction by being reduced in diameter along an insertion direction of the spigot into the socket.

* * * * *